(12) United States Patent
Johnson

(10) Patent No.: US 12,376,674 B1
(45) Date of Patent: Aug. 5, 2025

(54) SEAT INCORPORATED INTO DESK PLATFORM

(71) Applicant: Ronald B. Johnson, Honokaa, HI (US)

(72) Inventor: Ronald B. Johnson, Honokaa, HI (US)

( * ) Notice: Subject to any disclaimer, the term of this patent is extended or adjusted under 35 U.S.C. 154(b) by 280 days.

(21) Appl. No.: 18/127,894

(22) Filed: Mar. 29, 2023

(51) Int. Cl.
*A47B 39/02* (2006.01)
*B60B 33/00* (2006.01)

(52) U.S. Cl.
CPC ........ *A47B 39/023* (2017.08); *B60B 33/0078* (2013.01); *A47B 2220/06* (2013.01)

(58) Field of Classification Search
CPC ..... A47B 39/023; A47B 9/20; A47B 2270/06; B60B 33/0078
See application file for complete search history.

(56) References Cited

U.S. PATENT DOCUMENTS

| | | |
|---|---|---|
| 2,194,390 A | 3/1940 | Hubbard |
| 2,772,881 A | 12/1956 | Fundom |
| 3,756,595 A | 9/1973 | Hague |
| 3,970,302 A | 7/1976 | McFee |
| 4,023,795 A | 5/1977 | Pauls |
| 4,402,506 A | 9/1983 | Jones |
| 4,434,981 A | 3/1984 | Norton |
| 4,496,147 A | 1/1985 | Decloux |
| 4,529,194 A | 7/1985 | Haaheim |
| 4,645,201 A | 2/1987 | Evans |
| 4,659,077 A | 4/1987 | Stropkay |
| 4,679,786 A | 7/1987 | Rodgers |
| 4,709,918 A | 12/1987 | Grinblat |
| 4,733,858 A | 3/1988 | Lan |
| 4,850,585 A | 7/1989 | Dalebout |
| 4,867,443 A | 9/1989 | Jensen |
| 5,242,343 A | 9/1993 | Miller |
| 5,267,923 A | 12/1993 | Piaget |
| 5,299,993 A | 4/1994 | Habing |
| 5,304,106 A | 4/1994 | Gresko |
| 5,336,141 A | 8/1994 | Vittone |

(Continued)

FOREIGN PATENT DOCUMENTS

| | | | |
|---|---|---|---|
| CN | 110051131 A | * | 7/2019 |
| CN | 110367695 A | * | 10/2019 |

(Continued)

OTHER PUBLICATIONS

English translation of CN 110367695A (Year: 2025).*

*Primary Examiner* — Daniel J Rohrhoff
(74) *Attorney, Agent, or Firm* — Kenneth C. Booth; Booth Udall, PLC

(57) ABSTRACT

A desk assembly with a frame, a seat, and a desk. The frame is configured to support the desk assembly on a horizontal surface and has guide rails extending between a first end and a second end of the frame. The seat is securely attached to the first end of the frame and has an adjustable position. The desk has a desk platform and legs that are movably coupled to the guide rails. The desk is vertically adjustable between a standing position where the desk platform is positioned at a first height and a sitting position where the desk platform is positioned at a second height lower than the first height. While in use, the frame is configured to remain stationary with respect to the horizontal surface and the desk is moveable along the guide rails between the first end and the second end of the frame.

19 Claims, 10 Drawing Sheets

(56) References Cited

U.S. PATENT DOCUMENTS

| | | | |
|---|---|---|---|
| 5,383,829 A | 1/1995 | Miller | |
| 5,419,747 A | 5/1995 | Piaget | |
| 5,496,235 A | 3/1996 | Stevens | |
| 5,540,637 A | 7/1996 | Rodgers, Jr. | |
| 5,575,740 A | 11/1996 | Piaget | |
| 5,605,521 A | 2/1997 | Hsieh | |
| 5,735,773 A | 4/1998 | Vittone | |
| 5,792,029 A | 8/1998 | Gordon | |
| 5,813,947 A | 9/1998 | Densmore | |
| 5,857,940 A | 1/1999 | Husted | |
| 5,971,892 A | 10/1999 | Lee | |
| 6,019,709 A | 2/2000 | Piaget | |
| 6,117,052 A | 9/2000 | Frost | |
| 6,135,926 A | 10/2000 | Lee | |
| 6,206,806 B1 | 3/2001 | Chu | |
| 6,224,516 B1 * | 5/2001 | Disch | A63B 22/02 482/54 |
| 6,302,830 B1 | 10/2001 | Stearns | |
| 6,595,899 B2 | 7/2003 | Liang | |
| 6,689,019 B2 | 2/2004 | Ohrt | |
| 6,712,739 B1 | 3/2004 | Chen | |
| 6,875,160 B2 | 4/2005 | Watterson | |
| 7,169,088 B2 | 1/2007 | Rodgers, Jr. | |
| 7,614,991 B2 | 11/2009 | Fox | |
| 7,780,577 B2 | 8/2010 | Arnold | |
| 7,780,578 B2 | 8/2010 | Packham | |
| 7,833,134 B2 | 11/2010 | Gordon | |
| 7,892,148 B1 * | 2/2011 | Stauffer | A63B 22/0235 482/8 |
| 7,901,332 B1 | 3/2011 | Wen | |
| 7,951,050 B2 | 5/2011 | Raumann | |
| 9,486,070 B2 | 11/2016 | Labrosse | |
| 9,498,671 B1 | 11/2016 | Softky | |
| 9,511,254 B2 * | 12/2016 | Netter | A63B 22/0285 |
| 9,521,901 B2 | 12/2016 | Dalebout | |
| 9,737,138 B1 * | 8/2017 | Siebert | A63B 22/02 |
| 9,750,343 B2 | 9/2017 | McBride | |
| 9,795,827 B2 | 10/2017 | Wiener | |
| 9,925,403 B1 | 3/2018 | Zarli | |
| 9,955,789 B2 * | 5/2018 | Herring | A47C 7/006 |
| 10,046,197 B2 | 8/2018 | Gordon | |
| 10,413,777 B2 | 9/2019 | Hsieh | |
| 10,653,913 B2 | 5/2020 | Yao | |
| 10,668,323 B2 | 6/2020 | Chang | |
| 11,173,344 B2 | 11/2021 | Stehlik | |
| 11,877,655 B1 * | 1/2024 | Stewart | A63B 22/02 |
| 2001/0036885 A1 | 11/2001 | Castellot | |
| 2004/0162191 A1 | 8/2004 | Ercanbrack | |
| 2004/0176215 A1 | 9/2004 | Gramaccioni | |
| 2005/0054492 A1 | 3/2005 | Neff | |
| 2006/0046902 A1 | 3/2006 | Chang | |
| 2006/0264306 A1 | 11/2006 | Tischler | |
| 2007/0270284 A1 | 11/2007 | Lin | |
| 2008/0026916 A1 | 1/2008 | Chuang | |
| 2008/0096745 A1 | 4/2008 | Perry | |
| 2008/0167164 A1 | 7/2008 | Wang | |
| 2008/0214364 A1 | 9/2008 | Maresh | |
| 2012/0088633 A1 | 4/2012 | Crafton | |
| 2013/0085048 A1 | 4/2013 | Na | |
| 2014/0031175 A1 | 1/2014 | Peralo | |
| 2014/0073488 A1 | 3/2014 | Wu | |
| 2014/0187383 A1 | 7/2014 | Martin | |
| 2015/0250304 A1 | 9/2015 | Dalebout | |
| 2016/0082309 A1 * | 3/2016 | Wu | A63B 22/0207 482/54 |
| 2016/0296791 A1 | 10/2016 | Bailar | |
| 2016/0325137 A1 | 11/2016 | Bailar | |
| 2017/0027318 A1 * | 2/2017 | Nelson | A47B 13/081 |
| 2017/0113094 A1 | 4/2017 | Bailar | |
| 2018/0015321 A1 | 1/2018 | Ho | |
| 2019/0191869 A1 * | 6/2019 | Pensack | A47B 39/04 |
| 2019/0365090 A1 * | 12/2019 | Oakley | B60B 33/0078 |
| 2021/0046354 A1 * | 2/2021 | Oaks | A47B 83/001 |

FOREIGN PATENT DOCUMENTS

| | | | | |
|---|---|---|---|---|
| CN | 114698942 A | * | 7/2022 | A47B 39/023 |
| EP | 2915449 A1 | * | 9/2015 | A47B 21/02 |
| EP | 3288427 | | 3/2018 | |
| GB | 2329829 A | * | 4/1999 | A47B 39/02 |

* cited by examiner

SEAT INCORPORATED INTO DESK PLATFORM

TECHNICAL FIELD

Aspects of this document relate generally to a desk with an incorporated seat, and more specifically to a desk assembly for use with an exercise device that has a height adjustable desk and an incorporated seat.

BACKGROUND

When an exercise or movement apparatus, such as a treadmill, elliptical trainer, or motion platform, is used underneath a desk, it occupies the space that a desk chair or stool would normally use. In order to use a chair with that desk, a chair must be positioned on top of the apparatus, the apparatus must be moved from underneath the desk, or the desk must be moved away from the apparatus. Each of these options either includes increased risk or requires effort to move the necessary objects.

SUMMARY

Aspects of this document relate to a desk assembly comprising a frame configured to support the desk assembly on a horizontal surface, the frame having at least two guide rails extending between a first end and a second end of the frame distal to the first end and a supporting framework positioned between the first end and the second end and configured to support an exercise device, wherein each of the at least two guide rails is parallel with each guide rail of the at least two guide rails and configured to be parallel to the horizontal surface and wherein each guide rail of the at least two guide rails has a plurality of detents along a length of the guide rail configured to limit motion of the desk along the guide rail, a seat securely attached to the first end of the frame, wherein the seat has an adjustable position with respect to the frame, and a desk having a desk platform and at least two legs movably coupled to the at least two guide rails, the desk vertically adjustable between a standing position and a sitting position, wherein when the desk is in the standing position, the desk platform is positioned at a first height above the frame and when the desk is in the sitting position, the desk platform is positioned at a second height above the frame lower than the first height, wherein, while in use, the frame is configured to remain stationary with respect to the horizontal surface and the desk is moveable along the at least two guide rails between the first end and the second end of the frame.

Particular embodiments may comprise one or more of the following features. The desk assembly may further comprise a plurality of wheels coupled to the frame and configured to facilitate adjustment of a position of the desk assembly on the horizontal surface. The desk assembly may further comprise a floor lock having a locked configuration and an unlocked configuration, wherein when the floor lock is in the locked configuration, the floor lock limits movement of the desk assembly on the horizontal surface and when the floor lock is in the unlocked configuration, the floor lock allows movement of the desk assembly on the horizontal surface. The exercise device may be a treadmill.

Aspects of this document relate to a desk assembly comprising a frame configured to support the desk assembly on a horizontal surface, the frame having at least two guide rails extending between a first end and a second end of the frame distal to the first end, wherein each of the at least two guide rails lies within a plane parallel to the horizontal surface, a seat securely attached to the first end of the frame, and a desk having a desk platform and at least two legs coupled to the at least two guide rails, the desk vertically adjustable between a standing position and a sitting position, wherein when the desk is in the standing position, the desk platform is positioned at a first height above the frame and when the desk is in the sitting position, the desk platform is positioned at a second height above the frame different from the first height, wherein the desk is moveable along the at least two guide rails between the first end and the second end of the frame.

Particular embodiments may comprise one or more of the following features. Each of the at least two guide rails may be parallel to each other guide rail of the at least two guide rails. The seat may have an adjustable position with respect to the frame. The second height may be smaller than the first height. Each guide rail of the at least two guide rails may have a plurality of detents along a length of the guide rail configured to limit motion of the desk along the guide rail. The desk assembly may further comprise a supporting framework positioned between the first end and the second end of the frame and configured to support an exercise device. The exercise device may be a treadmill.

Aspects of this document relate to a desk assembly comprising a frame configured to support the desk assembly on a horizontal surface, a seat attached to a first end of the frame, and a desk coupled to the frame, the desk adjustable between a standing position and a sitting position, wherein when the desk is in the standing position, the desk is positioned at a first height above the frame and when the desk is in the sitting position, the desk is positioned at a second height above the frame different from the first height, wherein the desk is movable along a pathway extending between the first end and a second end of the frame distal to the first end.

Particular embodiments may comprise one or more of the following features. The frame may have at least two guide rails, wherein the desk is coupled to the at least two guide rails. The desk may be movable along the at least two guide rails. Each of the at least two guide rails may lie within a plane parallel to the horizontal surface. Each of the at least two guide rails may be parallel to each other guide rail of the at least two guide rails. Each guide rail of the at least two guide rails may have a plurality of detents along a length of the guide rail configured to limit motion of the desk along the guide rail. The seat may have an adjustable position with respect to the frame. The second height may be smaller than the first height. The desk assembly may further comprise a supporting framework positioned between the first end and the second end of the frame and configured to support an exercise device.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
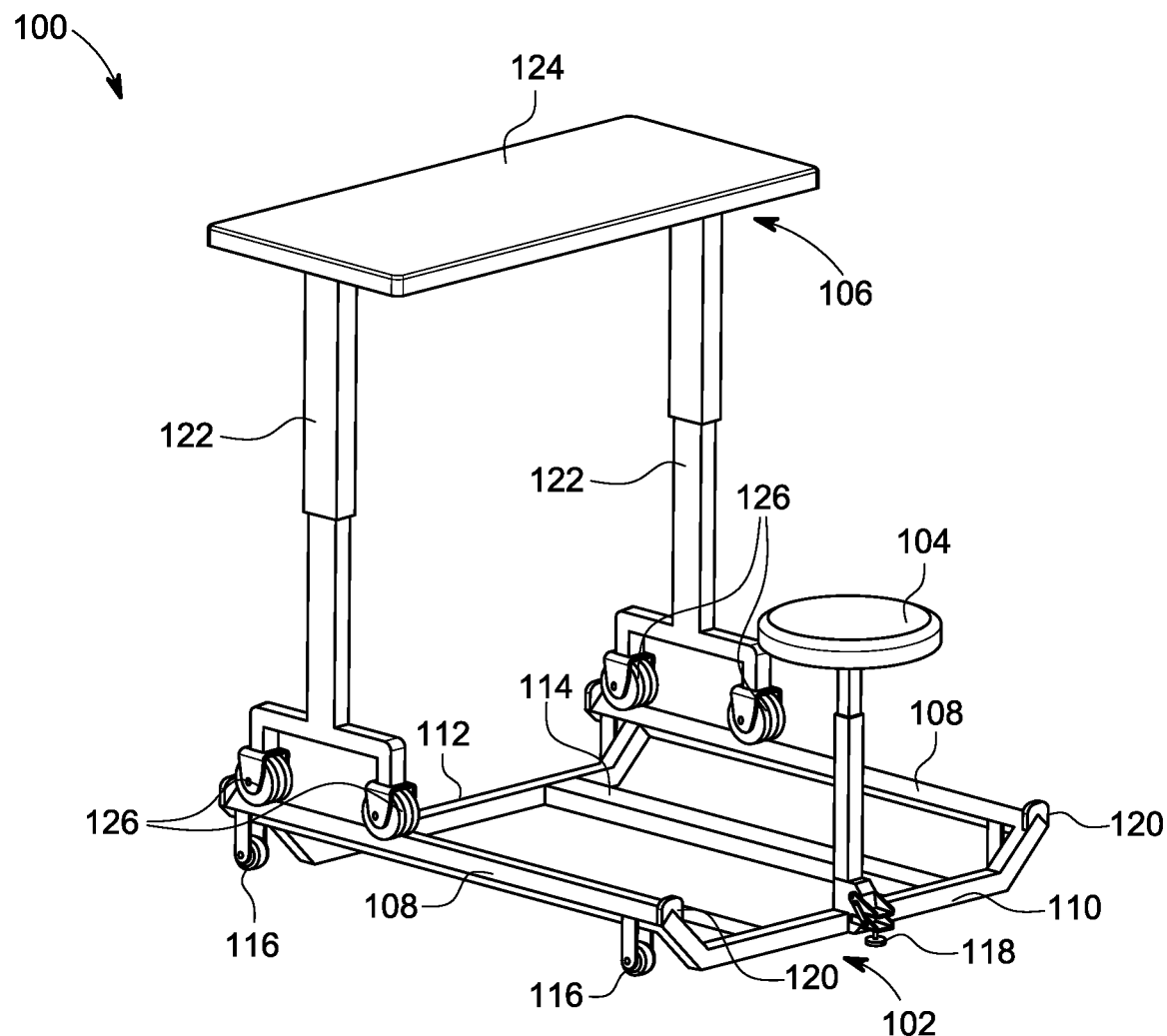
FIG. 1 is a perspective view of a desk assembly with the desk in the standing position.
Figure 2:
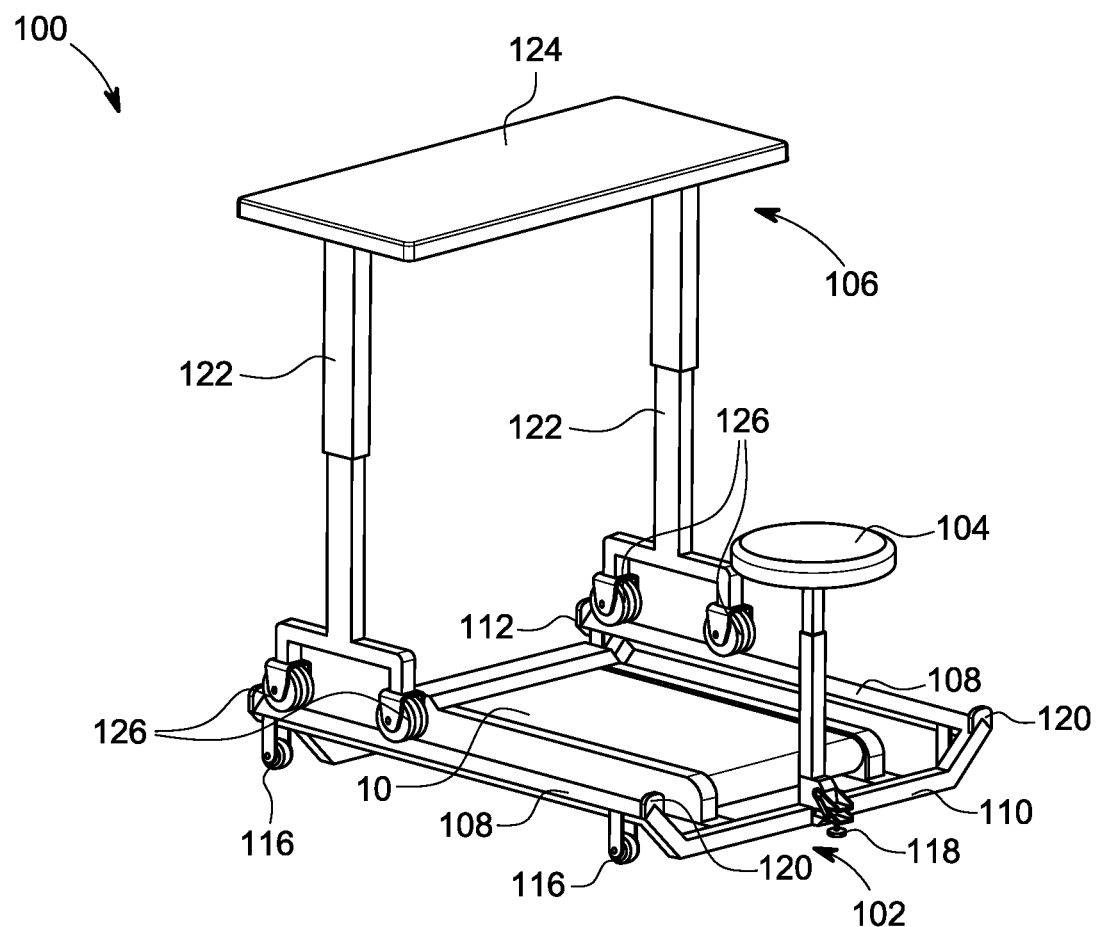
FIG. 2 is a perspective view of the desk assembly shown in FIG. 1 with the desk in the standing position and an exercise device positioned below the desk.
Figure 3:
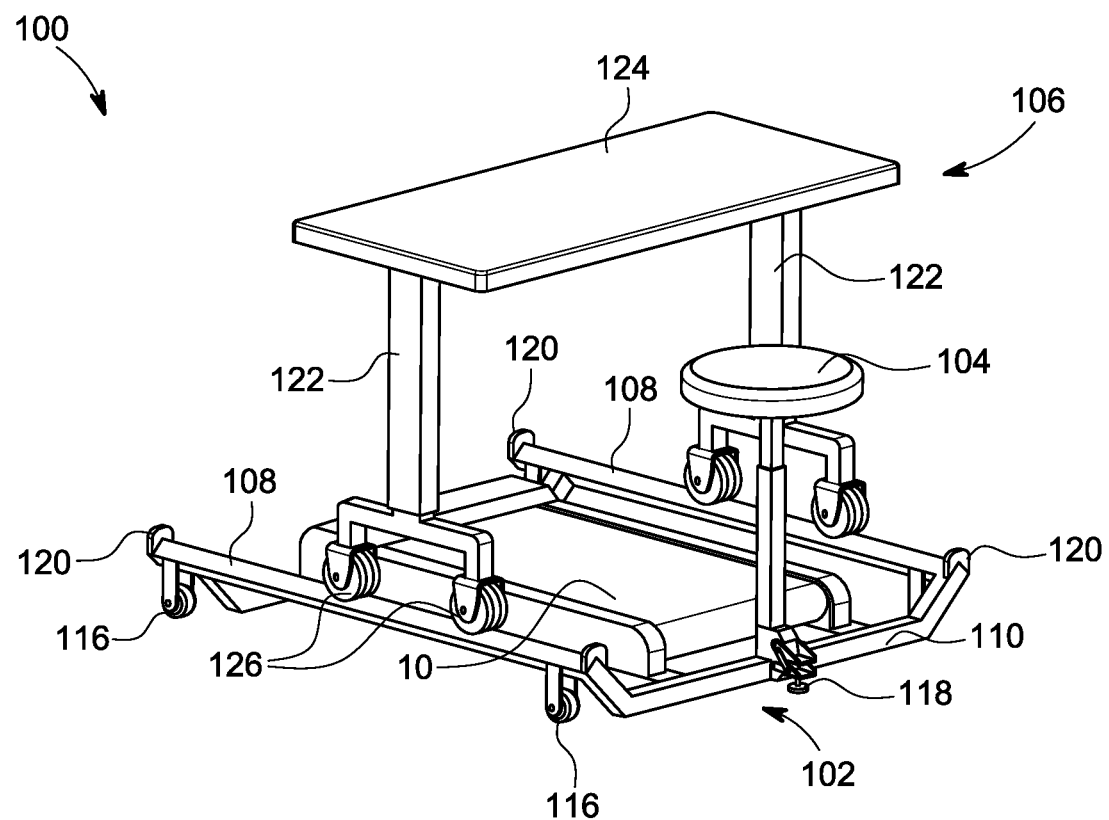
FIG. 3 is a perspective view of the desk assembly shown in FIG. 2 with the desk in the sitting position.
Figure 4:
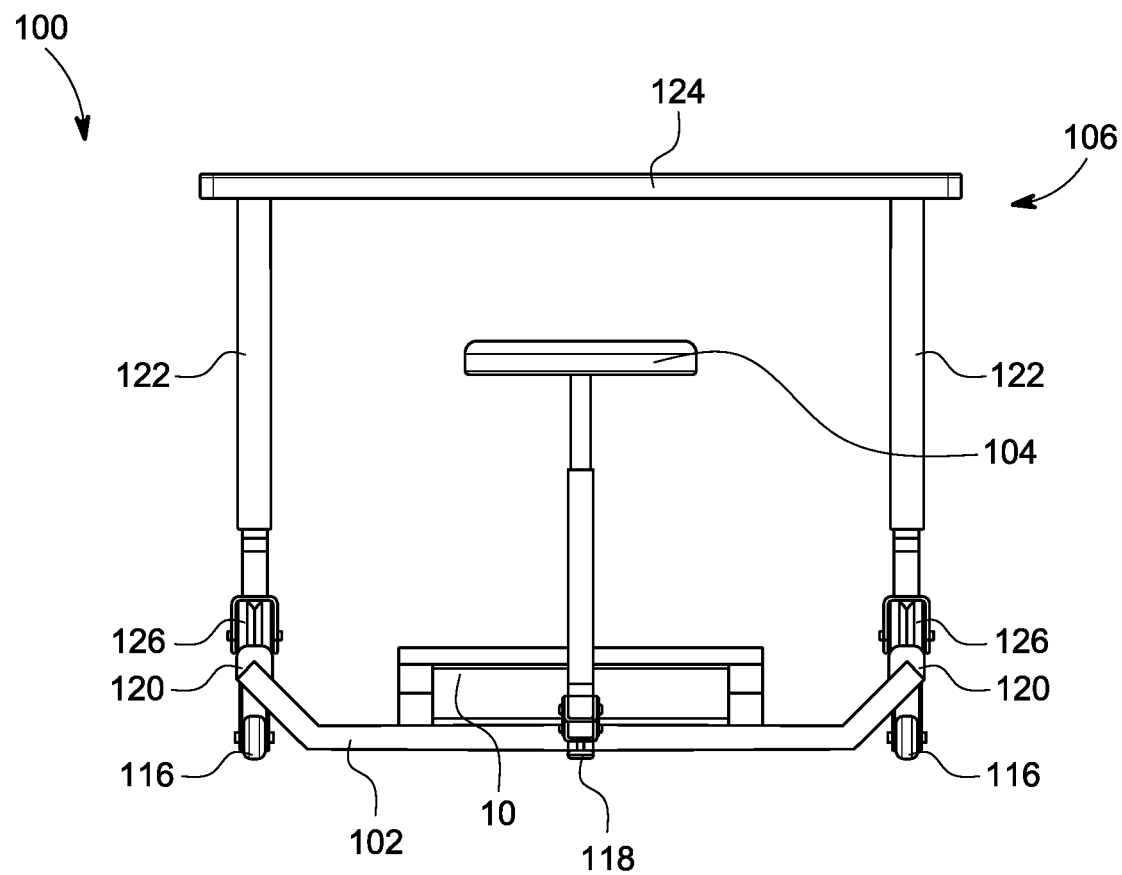
FIG. 4 is a front view of the desk assembly shown in FIG. 2 with the desk in the sitting position.
Figure 5:
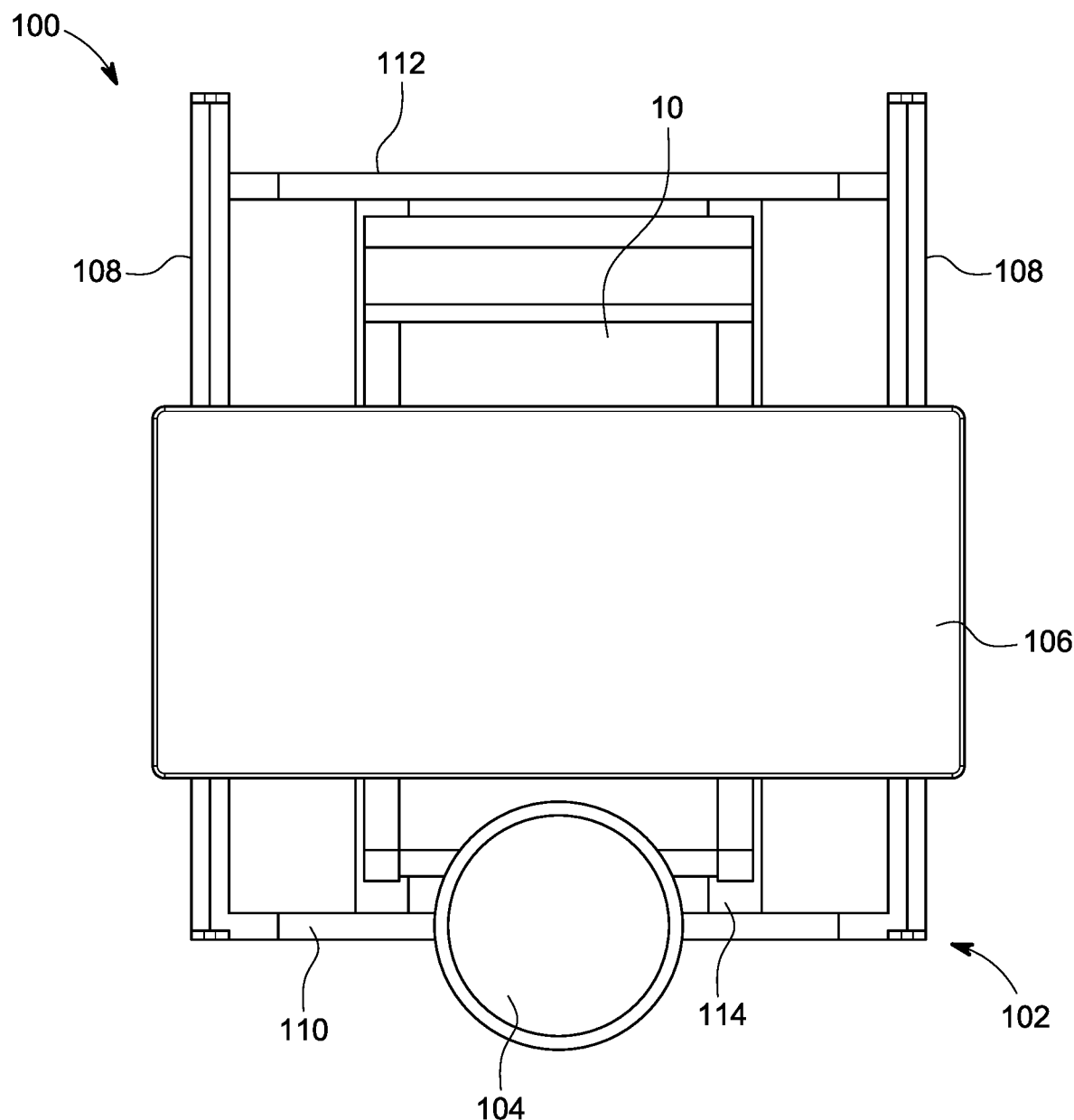
FIG. 5 is a top view of the desk assembly shown in FIG. 2 with the desk in the sitting position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a desk assembly 100 that is configured to allow an exercise device 10 to be used with the desk assembly 100 without interfering with normal use of the desk assembly 100. The desk assembly 100 comprises a frame 102, a seat 104, and a desk 106. While a traditional desk and chair combination has a stationary desk and a mobile chair, the seat 104 of the desk assembly 100 disclosed herein is configured to be stationary during use except when adjusting the height of the seat 104, and the desk 106 is configured to be movable up to and away from the seat 104. This allows the desk 106 to be positioned adjacent to the seat 104 when the user desires to sit at the desk 106, and then to be positioned away from the seat 104 when the user desires to stand and use the exercise device 10 while remaining at the desk 106. In this way, the seat 104 and the exercise device 10 do not need to occupy the same space, preventing the need for placing one on top of the other, or moving one to use the other with the desk 106.

The frame 102 is configured to support the desk assembly 100 on a horizontal surface. As will be clear to those of skill in the art, the horizontal surface may not be perfectly horizontal, but may be slightly angled. The frame 102 may be formed of a plurality of bars, beams, or tubing, as shown in FIG. 1. The frame 102 may have guide rails 108 that are configured to couple with the desk 106 as discussed in more detail below. The guide rails 108 provide a track along which the desk 106 can move. The guide rails 108 may be any type of linear guide that allows the desk 106 to move back and forth. In some embodiments, the frame 102 has at least two guide rails 108. The guide rails 108 may be parallel with the horizontal surface. Additionally, each guide rail 108 may be parallel with each other guide rail 108. This facilitates the movement of the desk 106 along the guide rails 108. The frame 102 may have a first end 110 and a second end 112 opposite the first end. The guide rails 108 may join the first end 110 to the second end 112.

Figure 8:
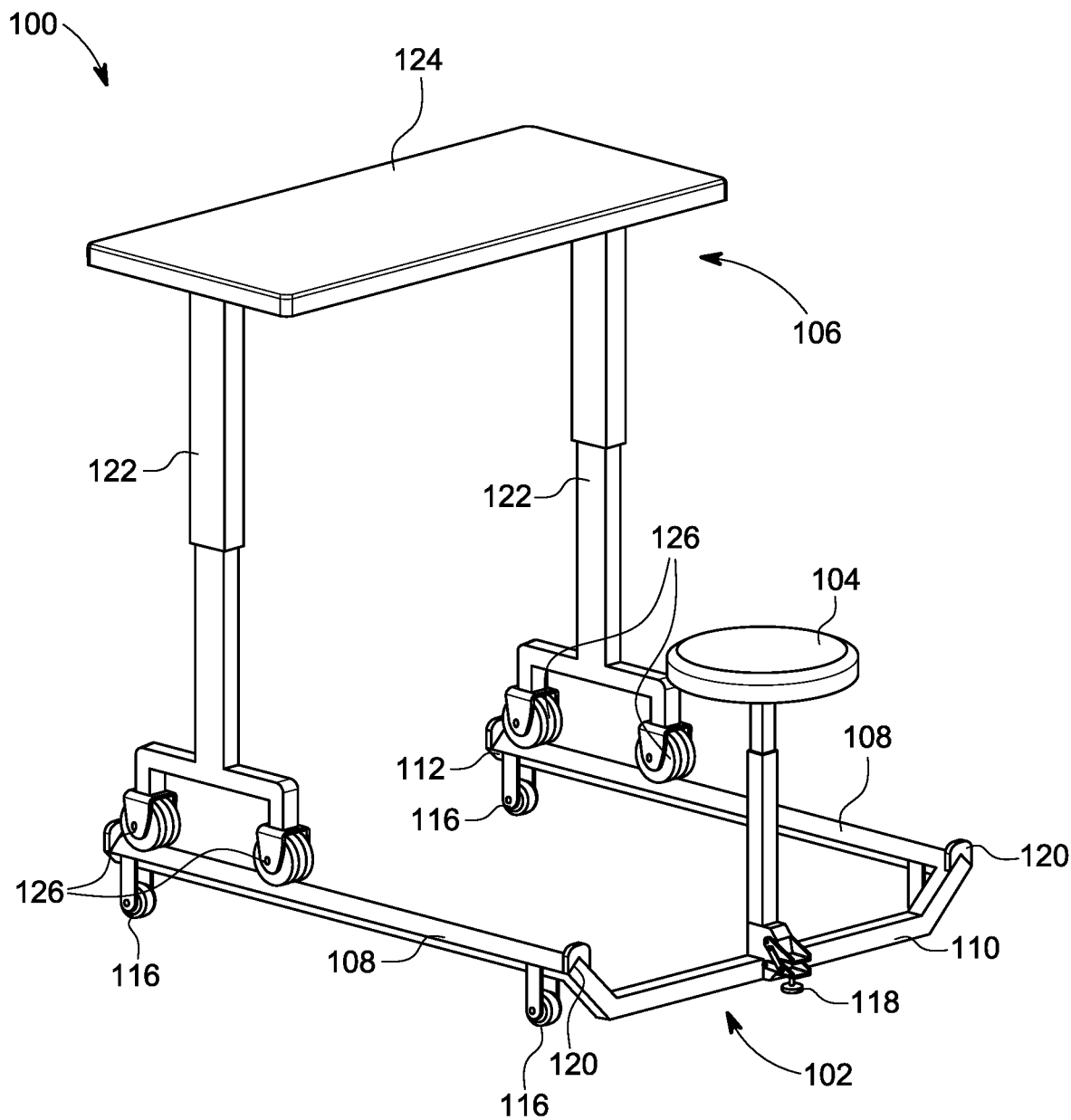
FIG. 8 is a perspective view of another embodiment of the desk assembly with the desk in the standing position.
Figure 9:
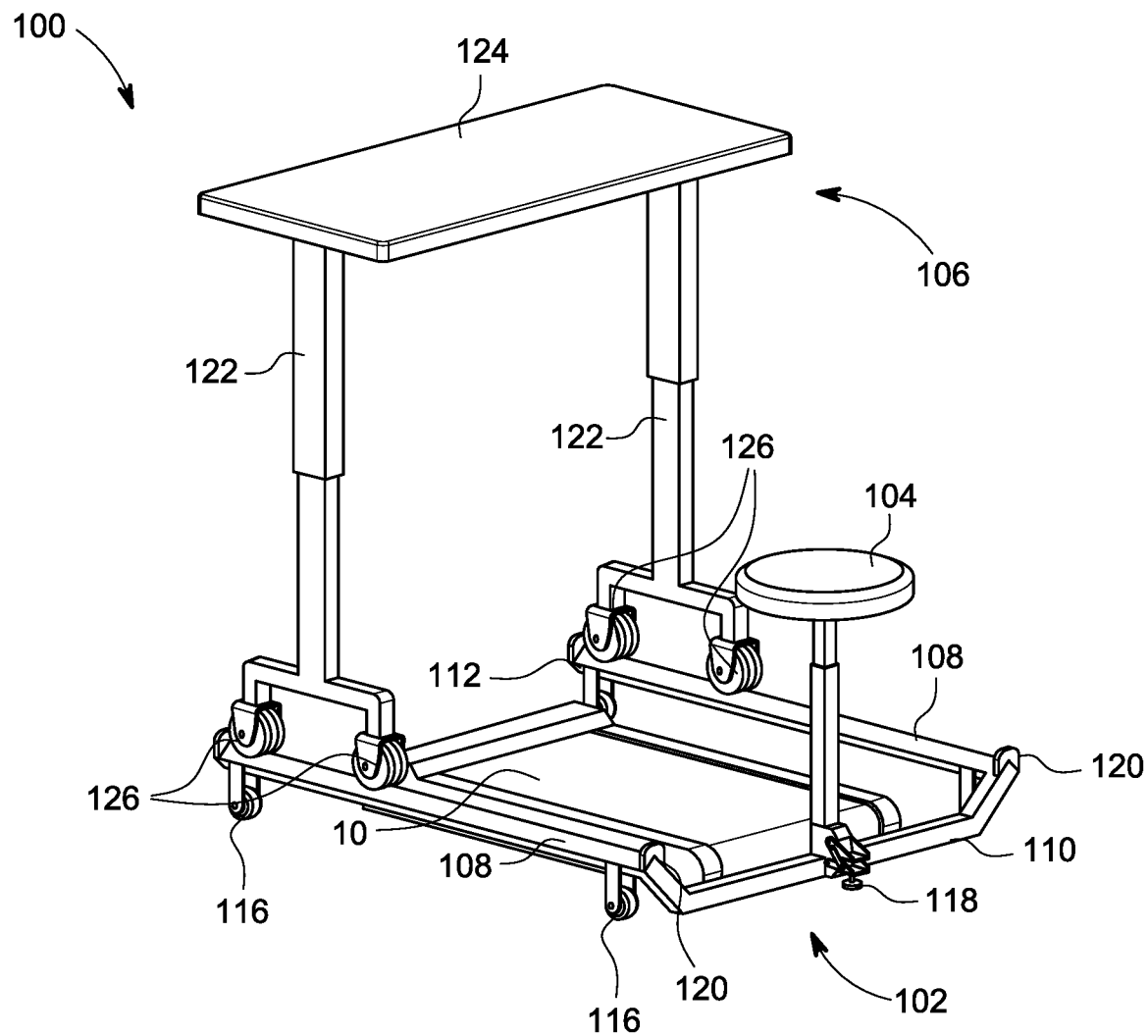
FIG. 9 is a perspective view of the desk assembly shown in FIG. 8 with an exercise desk positioned below the desk.

In some embodiments, as shown in FIGS. 1-5, the frame 102 may have a supporting framework 114 positioned between the first end 110 and the second end 112 that is configured to support the exercise device 10. This allows the exercise device 10 to be placed beneath the desk 106 without placing the exercise device 10 directly on the horizontal surface. Thus, when the desk assembly 100 needs to be moved, the exercise device 10 doesn't need to be moved separately, but instead is moved together with the desk assembly 110. In some embodiments, the exercise device 10 may be incorporated into the frame 102, such as disclosed in U.S. patent application Ser. No. 17/868,137, entitled "Body Motion Office Work Platform," to Ron Johnson, filed on Jul. 19, 2022, the disclosure of which is hereby incorporated herein by this reference. Other types of exercise devices 10, such as a treadmill, may similarly be incorporated into the frame 102. Some embodiments do not have a supporting framework 114, and instead have an empty space adjacent to the seat 104 that allows the exercise device 10 to be placed directly on the horizontal surface adjacent to the seat 104 so that, when the user stands up from the seat 104, the user can choose to step onto the exercise device 10 (see FIGS. 8 and 9).

As noted above, the seat 104 is securely attached to the frame 102 such that the seat 104 is stationary during use except when adjusting the height of the seat 104 with respect to the frame 102. Adjusting the height of the seat 104 may involve both a vertical adjustment and a horizontal adjustment. For example, the seat 104 may be configured to move away from the frame 102 horizontally as the height is increased and toward the frame 102 as the height is decreased, and also vertically. In particular implementations, the horizontal and vertical movement may be accomplished through an angled adjustment mechanism, such as, without limitation, a seat 104 support bar that is configured at an angle extending diagonally up and rearward, away from the frame 102. This accommodates users with longer legs by moving the seat 104 further away when the height is raised and also accommodates users with shorter legs by bringing the seat 104 closer when the height is lowered. Any mechanism known in the art may be used to adjust the height of the seat 104, from manually operated fasteners to electric motors. The seat 104 may be attached to a first end 110 of the frame 102, and the desk 106 may be movable between the first end 110 and the second end 112. In particular embodiments, the desk 106 is movable from the first end 110 to the second end 112, and in other embodiments, the desk 106 is movable between the first end 110 and the second end 112 without reaching the first end 110 or the second end 112.

The desk assembly 100 may also comprise a plurality of wheels 116 coupled to the frame 102. The wheels 116 are positioned between the desk assembly 100 and the horizontal surface and are configured to facilitate adjustment of the position of the desk assembly 100 on the horizontal surface. For example, when the user needs to move the desk assembly 100, such as to clean underneath the desk assembly 100, the wheels 116 allow the desk assembly 100 to be moved without lifting or dragging the desk assembly 100.

The desk assembly 100 may also comprise a floor lock 118 that is configured to selectively lock the desk assembly 100 in place on the horizontal surface. Thus, once the desk assembly 100 is positioned in the desired location on the horizontal surface, the floor lock 118 can be used to lock, disable, or override the mobility of the wheels 116 so that the desk assembly 100 is locked in place. In some embodiments, the floor lock 118 has a locked configuration and an unlocked configuration. When the floor lock 118 is in the locked configuration, the floor lock 118 limits movement of the desk assembly 100 on the horizontal surface, and when the floor lock 118 is in the unlocked configuration, the floor lock 118 allows movement of the desk assembly 100 on the horizontal surface. The floor lock 118 may be a foot coupled to the frame 102 that is movable via a mechanism to engage with the horizontal surface when in the locked configuration and disengage with the horizontal surface when in the unlocked configuration.

Figure 6:
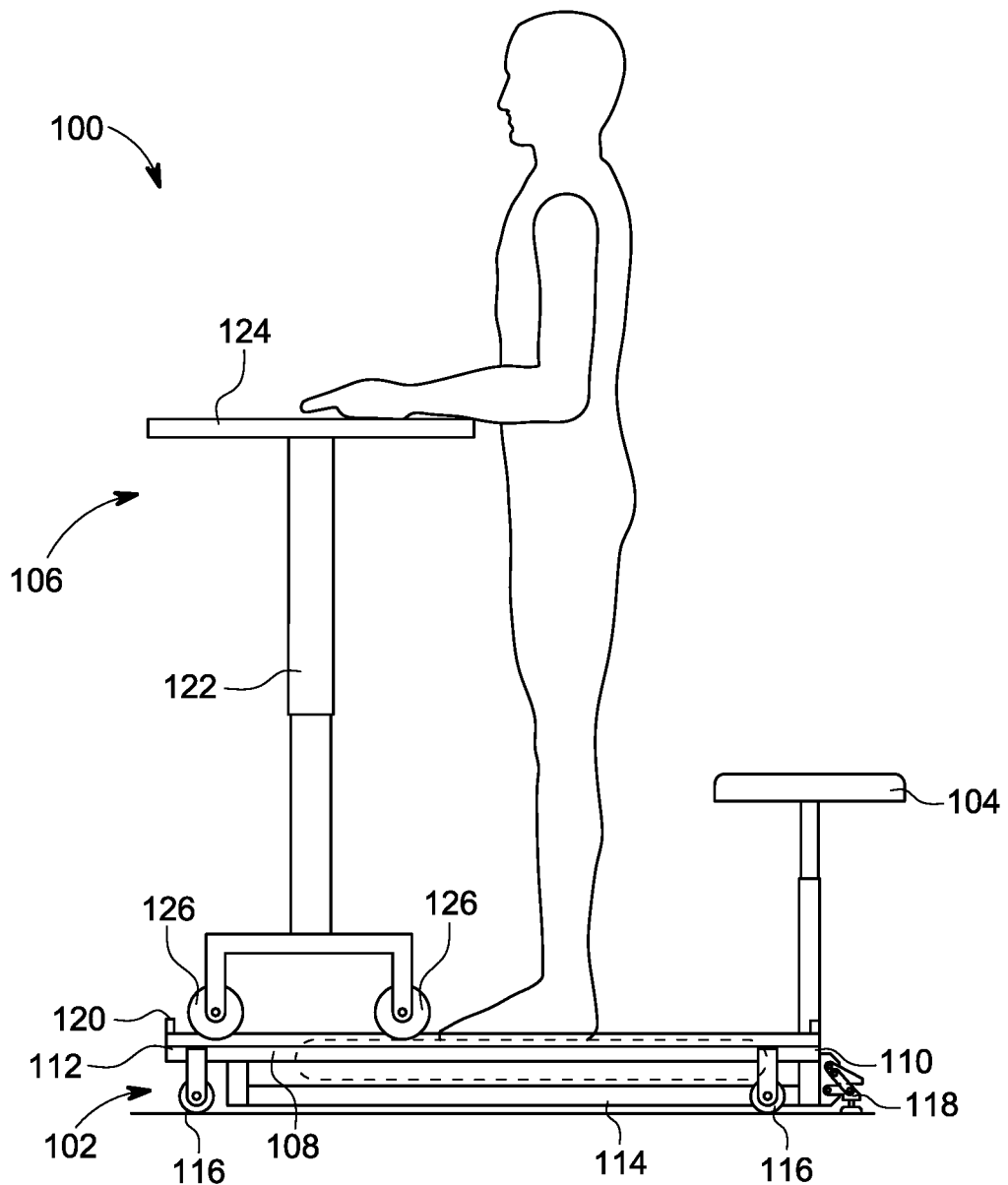
FIG. 6 is a side view of the desk assembly shown in FIG. 2 in use with the desk in the standing position.
Figure 7:
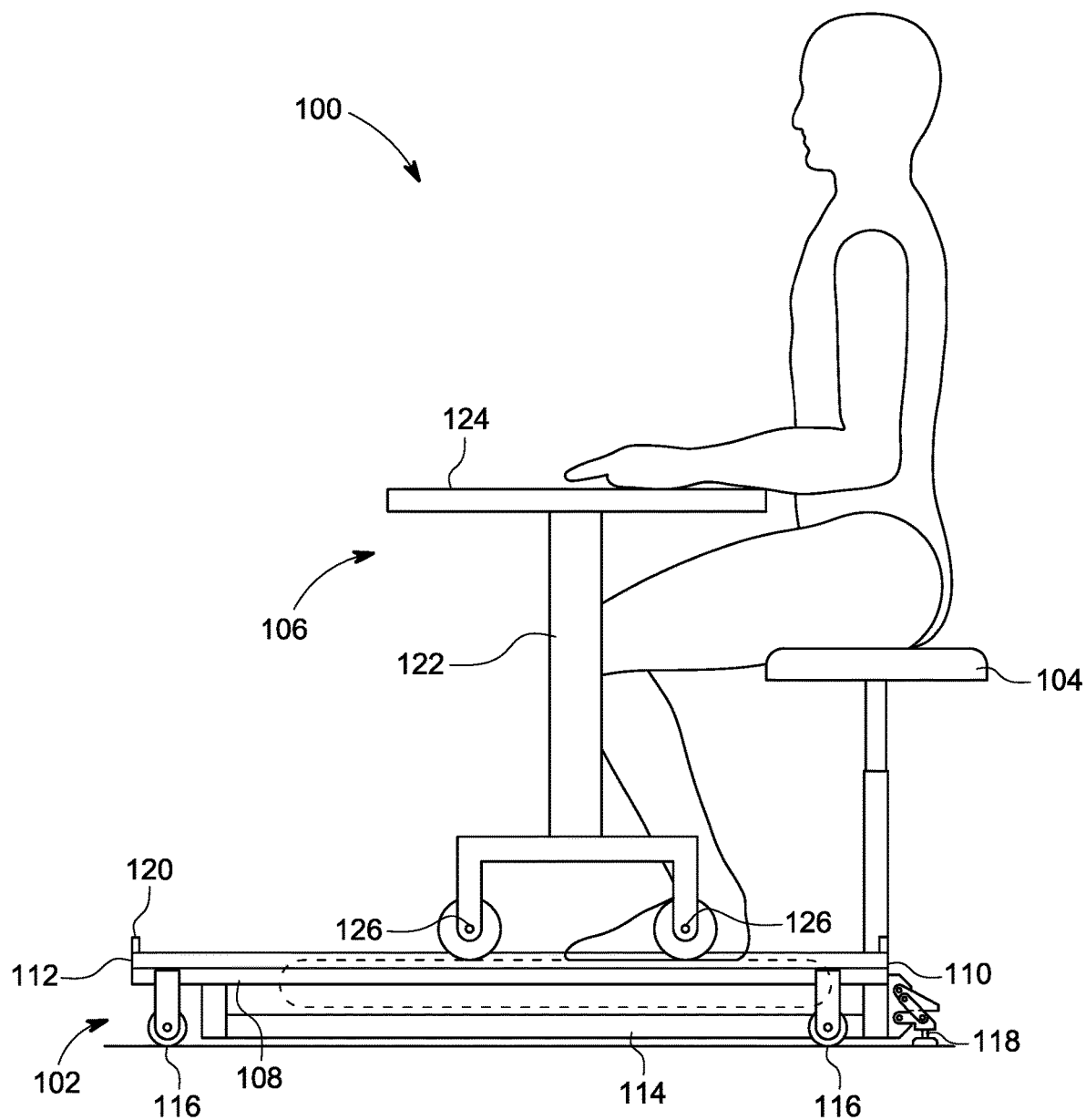
FIG. 7 is a side view of the desk assembly shown in FIG. 2 in use with the desk in the sitting position.

As mentioned above, the desk 106 may be movably coupled to the guide rails 108 of the frame 102, and thus may be slidable, rollable, or movable along the guide rails 108 between the first end 110 and the second end 112. This allows the desk 106 to be moved into a position near the second end 112, where the user can stand on and use the exercise device 10 while remaining at the desk 106 (see FIG. 6) and allows the desk 106 to be moved into a position near the first end 110, where the user can sit on the seat 104 while remaining at the desk 106 (see FIG. 7). The guide rails 108 may have stops 120 positioned on the ends of the guide rails 108 to prevent the desk 106 from moving or rolling off of the guide rails 108.

The desk 106 may have a plurality of legs 122 configured to support a desk platform 124 above the frame 102. The legs 122 may be mounted on wheels 126 that are configured to facilitate movement of the desk 106 on the guide rails 108. In some embodiments, the wheels 126 are integrated into the desk 106, being directly attached to the legs 122. In some embodiments, the wheels 126, or any other component used to provide motion to the desk 106 along the guide rails 108, may be separate from the desk 106 and may have a platform on which the desk 106 can rest. Thus, any desk could be switched out by simply placing the desk on top of the platforms to allow the desk 106 to move along the guide rails 108. In some embodiments, the legs 122 are mounted on carriages that are slidably attached to the frame 102.

The legs 122 may have an adjustable length, thus making the desk 106 vertically adjustable between a standing position and a sitting position. Any method of adjusting the length of the legs 122 may be used, from manually operated fasteners to an electric motor. An example of a height adjustable desk can be found in U.S. patent application Ser. No. 17/868,034, entitled "Height Adjustable Desk" to Ron Johnson, filed on Jul. 19, 2022, the disclosure of which is hereby incorporated herein by this reference. Any other method of adjusting the height of a desk as known in the art may also be used. When the desk 106 is in the standing position, the desk platform 124 is positioned at a first height above the frame 102 and when the desk 106 is in the sitting position, the desk platform 124 is positioned at a second height above the frame 102 different from the first height. The second height may be smaller than the first height, with the desk platform 124 being raised when moved from the sitting position to the standing position.

It is desirable for the desk 106 to move easily along the guide rails 108, but then to remain stationary once the desk 106 is in the desired position. Thus, the desk 106 may include a locking mechanism such as a brake to prevent the desk 106 from rolling out of the desired position until the user wishes to move the desk 106 again and therefore disengages the locking mechanism. In some embodiments, a mechanism may be included that applies a constant, fixed drag to the desk 106 to keep the desk 106 stationary until an intentional push or pull overcomes the drag to move the desk 106

Figure 10:
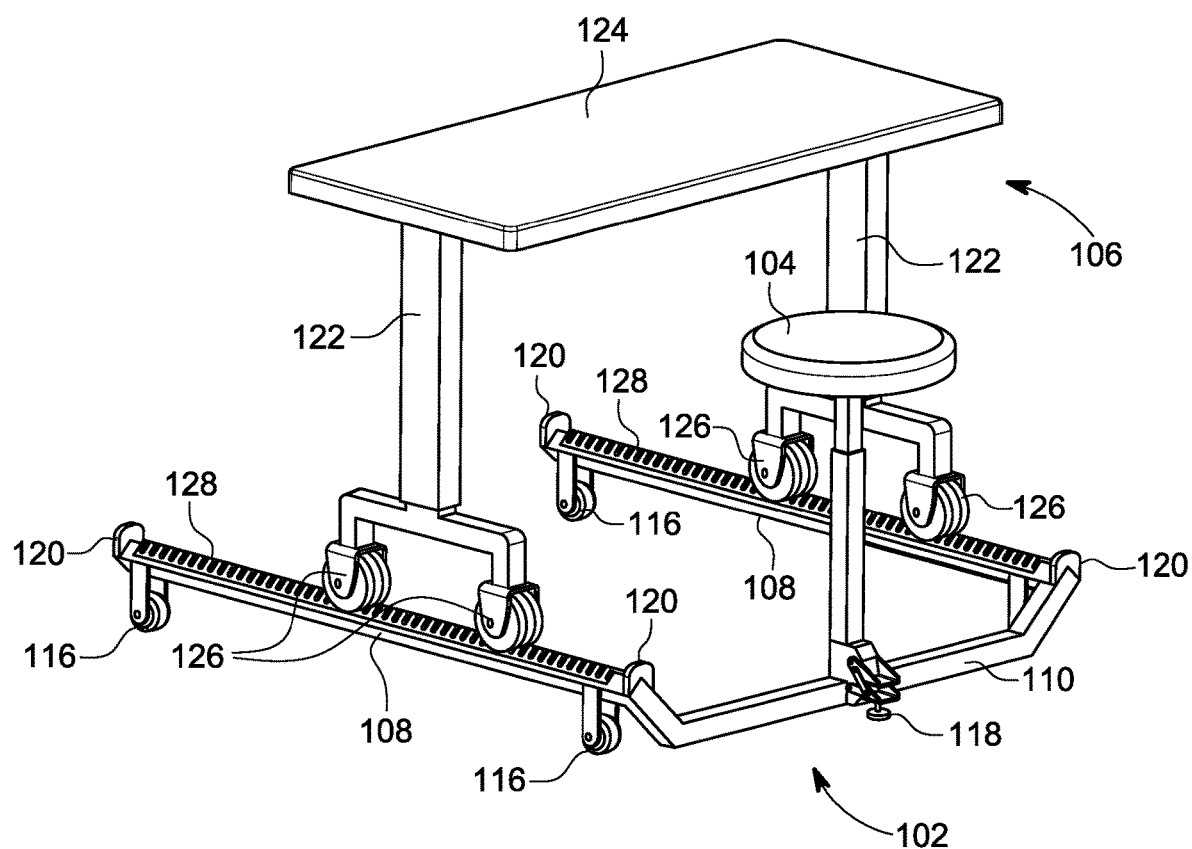
FIG. 10 is a perspective view of the desk assembly shown in FIG. 8 with detents applied to the guide rails.

As shown in FIG. 10, the guide rails 108 may have a plurality of detents 128 or slots either applied directly to the guide rails 108 or applied to an elongated component that fits over the guide rails 108. The detents 128 provide discrete points along the guide rails 108 at which the desk 106 can stop and then remain in place. The detents 128 are thus configured to limit motion creep of the desk 106 along the guide rails 108 that may occur without any locking mechanism or with a constant, fixed drag while still allowing the desk 106 to be easily moved when desired. Additionally, the detents 128 do not require any specific activation or adjustment, and thus improve the function of the desk 106 without interfering with normal use.

It will be understood that implementations of a desk assembly are not limited to the specific assemblies, devices and components disclosed in this document, as virtually any assemblies, devices and components consistent with the intended operation of a desk assembly may be used. Accordingly, for example, although particular desk assemblies, and other assemblies, devices and components are disclosed, such may include any shape, size, style, type, model, version, class, measurement, concentration, material, weight, quantity, and/or the like consistent with the intended operation of desk assemblies. Implementations are not limited to uses of any specific assemblies, devices and components; provided that the assemblies, devices and components selected are consistent with the intended operation of a desk assembly.

Accordingly, the components defining any desk assembly may be formed of any of many different types of materials or combinations thereof that can readily be formed into shaped objects provided that the materials selected are consistent with the intended operation of a desk assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various desk assemblies may be manufactured using conventional procedures as added to and improved upon through the procedures described here. Some components defining a desk assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling desk assemblies are not limited to the specific order of steps as disclosed in this document. Any steps or sequence of steps of the assembly of a desk assembly indicated herein are given as examples of possible steps or sequence of steps and not as limitations, since various assembly processes and sequences of steps may be used to assemble desk assemblies.

The implementations of a desk assembly described are by way of example or explanation and not by way of limitation. Rather, any description relating to the foregoing is for the exemplary purposes of this disclosure, and implementations may also be used with similar results for a variety of other applications employing a desk assembly.

What is claimed is:

1. A desk assembly comprising:
 a frame configured to support the desk assembly on a horizontal surface, the frame having at least two guide rails configured to be positioned above and without contacting the horizontal surface, the at least two guide rails extending between a first end and a second end of the frame distal to the first end and a supporting framework positioned between the first end and the second end and configured to support an exercise device above the horizontal surface without contacting with the horizontal surface, wherein each of the at least two guide rails is parallel with each guide rail of the at least two guide rails and configured to be parallel to the horizontal surface and wherein each guide rail of the at least two guide rails has a plurality of detents on a top surface of the at least two guide rails along a length of the guide rail configured to limit motion of the desk along the guide rail;
 a seat securely attached to the first end of the frame, wherein the seat has a vertically adjustable position with respect to the frame; and
 a desk having a desk platform and at least two legs movably coupled to, positioned above and supported upon the detents of the at least two guide rails, the desk vertically adjustable between a standing position and a sitting position, wherein when the desk is in the standing position, the desk platform is positioned at a first height above the frame and when the desk is in the sitting position, the desk platform is positioned at a second height above the frame lower than the first height;
 wherein, while in use, the frame is configured to remain stationary with respect to the horizontal surface and the desk is moveable along the at least two guide rails between the first end and the second end of the frame.

2. The desk assembly of claim 1, further comprising a plurality of wheels coupled to the frame and configured to facilitate adjustment of a position of the desk assembly on the horizontal surface.

3. The desk assembly of claim 1, further comprising a floor lock having a locked configuration and an unlocked configuration, wherein when the floor lock is in the locked configuration, the floor lock limits movement of the desk assembly on the horizontal surface and when the floor lock is in the unlocked configuration, the floor lock allows movement of the desk assembly on the horizontal surface.

4. The desk assembly of claim 1, wherein the exercise device is a treadmill.

5. The desk assembly of claim 1, where the at least two legs are coupled to the at least two guide rails through a plurality of V-groove wheels.

6. A desk assembly comprising:
a frame configured to support the desk assembly on a horizontal surface, the frame having at least two guide rails extending between a first end and a second end of the frame distal to the first end, wherein each of the at least two guide rails lies within a plane parallel to the horizontal surface;
a seat having a base fixedly attached to the first end of the frame; and
a desk having a desk platform and at least two legs coupled to the at least two guide rails, the desk vertically adjustable between a standing position and a sitting position, wherein when the desk is in the standing position, the desk platform is positioned at a first height above the frame and when the desk is in the sitting position, the desk platform is positioned at a second height above the frame different from the first height;
wherein the desk is moveable along the at least two guide rails between the first end and the second end of the frame;
wherein the frame further comprises a supporting framework positioned between the first end and the second end of the frame and configured to support all of an exercise device upon the supporting framework without the exercise device directly contacting the horizontal surface.

7. The desk assembly of claim 6, wherein the seat has vertically adjustable position with respect to the frame.

8. The desk assembly of claim 5, wherein the second height is smaller than the first height.

9. The desk assembly of claim 6, wherein each guide rail of the at least two guide rails has a plurality of detents along a length of the guide rail on a top surface of the guide rail configured to limit motion of the at least two legs of the desk along the guide rail.

10. The desk assembly of claim 6, wherein the exercise device is a treadmill.

11. The desk assembly of claim 6, where the at least two legs are coupled to the at least two guide rails through a plurality of V-groove wheels.

12. A desk assembly comprising:
a frame configured to support the desk assembly on a horizontal surface; the frame further comprising a supporting framework positioned between the first end and the second end of the frame and configured to support all of an exercise device upon the supporting framework without the exercise device directly contacting the horizontal surface;
a seat having a base fixedly attached to a first end of the frame and the seat vertically adjustable with respect to the frame; and
a desk coupled to the frame, the desk adjustable between a standing position and a sitting position, wherein when the desk is in the standing position, the desk is positioned at a first height above the frame and when the desk is in the sitting position, the desk is positioned at a second height above the frame different from the first height;
wherein the desk is movable along a pathway extending between the first end and a second end of the frame distal to the first end.

13. The desk assembly of claim 12, the frame having at least two guide rails, wherein the desk is coupled to the at least two guide rails.

14. The desk assembly of claim 13, wherein the desk is movable along the at least two guide rails.

15. The desk assembly of claim 13, wherein each of the at least two guide rails lies within a plane parallel to the horizontal surface.

16. The desk assembly of claim 13, wherein each guide rail of the at least two guide rails has a plurality of detents along a length of the guide rail on a top surface of the guide rail configured to limit motion of the at least two legs of the desk along the guide rail.

17. The desk assembly of claim 12, wherein the seat has vertically adjustable position with respect to the frame.

18. The desk assembly of claim 12, wherein the second height is smaller than the first height.

19. The desk assembly of claim 12, where the at least two legs are coupled to the at least two guide rails through a plurality of V-groove wheels.

* * * * *